Jan. 30, 1951  E. L. HOFFMANN  2,539,836
ELECTRIC MOTOR BRAKE
Filed July 6, 1948

Inventor:
Elmer L. Hoffmann
By
Attorney

Patented Jan. 30, 1951

2,539,836

UNITED STATES PATENT OFFICE 2,539,836

ELECTRIC MOTOR BRAKE

Elmer L. Hoffmann, Park Ridge, Ill., assignor to Raymond T. Moloney, Chicago, Ill.

Application July 6, 1948, Serial No. 37,235

7 Claims. (Cl. 172—36)

This invention pertains to electric motors and brake means therefor, and particularly, but not exclusively, to fractional horsepower motors, and automatic magneto-mechanical braking devices for stopping the same abruptly under load and otherwise.

Vast numbers of the smaller varieties of electric motors are utilized in installations requiring quick stopping or braking, and numbers of contrivances are employed as braking means, most of these being designed to operate more or less automatically upon dynamic or electromagnetic principles, a common arrangement being the utilization of movements of the armature into and out of the main field gap out of, and into, engagement with some form of brake disc. The latter and other forms of brake are subject to numbers of objections including the fact that the armature tends to coast under load after the power is shut off, and the braking is frequently too slow; such prior devices are also subject to variations in operating performance where the motor is mounted in different positions, and where the line voltages fluctuate considerably.

The present invention provides an electromechanical brake which is simple in construction, quick-acting, effective in any position, relatively insensitive to power line fluctuations and tendencies to coast even when used with gear trains, and which is peculiarly adaptable to standard motor construction in so far as it does not require any modifications or special or expensive alteration of existing design, and which, in addition to the foregoing advantages, has a long operating life even for sustained rapidly intermittent operation.

Additional advantages and aspects of novelty in the invention pertain to details of the construction and operation of the embodiment described hereinafter in view of the annexed drawing, in which.

Figure 1:
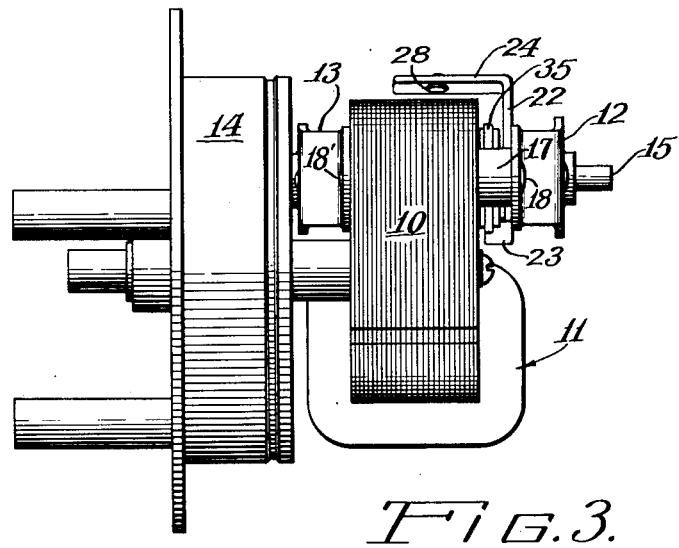
Fig. 1 is a side elevation of a motor equipped with reduction gear and the novel brake.

Referring to Fig. 1, the side elevation there shown discloses the motor field core 10, field winding 11, bearing yokes 12 and 13, and a conventional reduction gear unit 14, together with the armature shaft 15.

Figure 2:
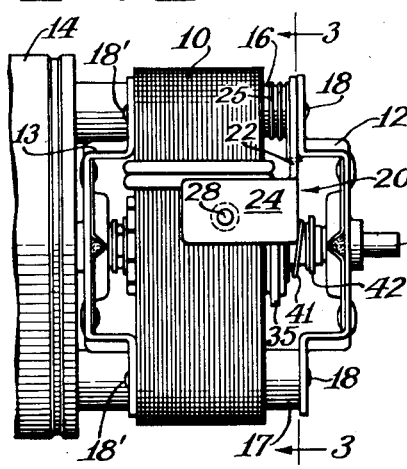
Fig. 2 is a fragmentary top plan view of the brake and motor parts appearing in Fig. 1.

As in Fig. 2, the yoke 12 is spaced from the core 10 by collars 16 and 17, and held by headed pins 18 also headed at their opposite ends 18' to secure the other yoke 13 in place.

Pivoted on a reduced portion of the collar 16 (Figs. 2 and 3) is the brake lever 20 having angularly extensive arms 21 and 22 with a brake pawl or offset 23 formed at the end of the lower arm 21, and a magnetic offset or arm 24, which is normally raised or biased away from the motor core 10 by action of a spring 25 (Figs. 2 and 3) having one end anchored on screw 26, with its main convolutions disposed about the collar 16 and its opposite end 27 hooked under the upper or magnetic arm 22 of the brake.

Figure 3:
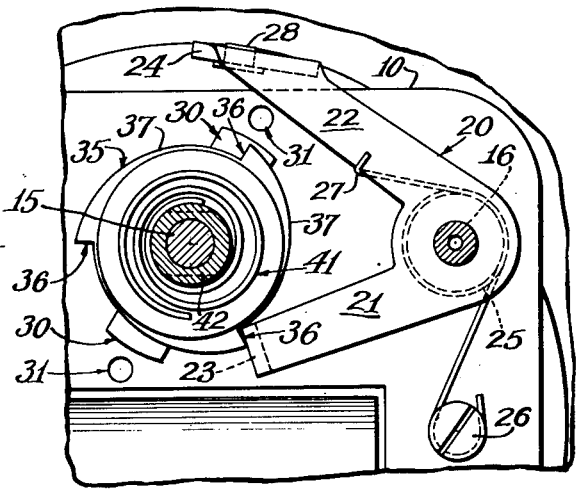
Fig. 3 is an enlarged sectional detail along lines 3—3 of Fig. 2 showing the brake arm and other brake parts in elevation.

The magnetic or actuating offset or extension 24 of the brake lever is provided with a non-magnetic plug 28 headed into the same and serving to prevent magnetic sticking of the member to the core under any residual magnetic effects in either the core or the lever; and this part of the brake lever is importantly located with regard to the availability of sufficient magnetic field from the motor core to attract said part or offset 24 to and against the core when the motor is energized and running to rock the brake lever 20 out of its normal braking position shown in Fig. 3, for example, to render the brake ineffective.

It should be observed in the latter arrangement, in view of Fig. 3, that the attractable part 24 of the brake lever is situated close to and above one of the pole gaps 30 formed in the core; and for the purpose of further concentrating and increasing the intensity of the magnetic field in the region of the magnetic portion 24 of the brake, gap holes 31 are drilled into the core at critical positions, as shown; and while the brake can be made to operate satisfactorily without such gapping in available portions of the motor field, the preferred arrangement shown gives very satisfactory and reliable results.

The remaining brake structure consists of a notched brake disc of stainless steel, indicated at 35, Fig. 3, and having a plurality, preferably three, braking notches 36 formed equidistantly thereabout with cammed peripheral portions 37 intervening, the braking pawl portion 23 on the lower lever arm engaging in any of said notches to arrest rotation of said brake disc, in the manner illustrated in Fig. 3.

Figure 4:
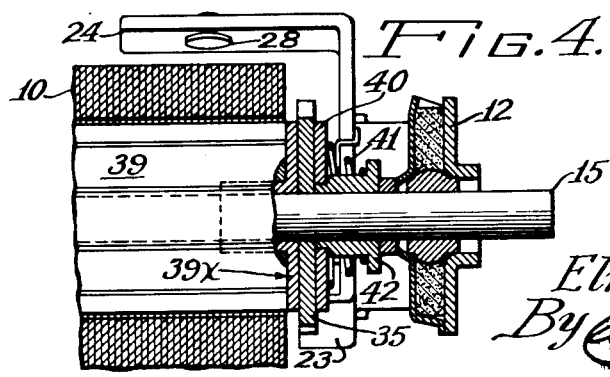
Fig. 4 is a vertical sectional detail through the brake proper with the armature shaft shown in elevation.

As viewed in Fig. 4, the brake disc 35 is pressed against the motor armature 39, and more particularly against the copper end face 39X thereof, by a brass disc 40 under pressure of a spring 41 on a shouldered collar 42 force-fitted onto the shaft 15, so that there is a constant tendency for the brake disc to rotate with the shaft as a result of the foregoing friction-clutching of the spring-urged disc means 40—41—42, the forces acting here being calculated to arrest the armature or rotor portion of the motor whenever the brake pawl portion 23 is in position to engage in one of the brake disc notches 36.

In the operation of the device, the normal braking position of the parts is shown in Fig. 3. Assuming the motor field winding 11 to be energized and the motor to be running, there will be sufficient magnetic field in the region of the uppermost pole gaps and field-concentrating bores or holes 30 and 31 to cause the brake extension 24 to be attracted downwardly against the core 10 to rock the brake lever 20 in an anticlockwise direction, thereby withdrawing the brake pawl 23 from notch 36, so that the brake disc 35 may rotate freely with the armature 39, since it is pressed against the copper end slug 39X thereof by the spring 41 acting against the brass disc 40.

Upon de-energization of the motor winding, as when the motor is shut off, the magnetic field responsible for attracting the brake extension 24 disappears, and spring 25 rotates the brake lever 20 clockwise, Fig. 3, to position the brake pawl 23 in the path of one of the notches 36, which will occur in less than one revolution of the armature, so that the latter will be abruptly yet yieldably stopped through the action of the spring clutch or friction means 40—41—42 on shaft 15.

It should be observed in the construction of Fig. 4, particularly, that the braking mechanism is very compactly contrived to fit into the conventional motor bearing and armature mounting means 12, etc., and that there is no dependency whatever upon any axial shifting or movement of the main armature shaft for any braking operation.

By locating the brake extension or magnetic actuating part thereof, 24, in selected regions of field strength, or by predetermining the available field strength for brake operation, as by critically locating gap means such as the holes 31, particularly, the sensitivity of the brake to fluctuations in field strength may be given adequate latitude to prevent false operation by variations in line voltage, and similar disturbances, to much greater degree than is possible with prior devices of this class.

The offset brake armature 24 is efficiently situated, as aforesaid, so as to extend crosswise of the field frame laminations, especially where the area of said armature portion is to be kept small, or where shading coils are employed, as in Fig. 2, and the armature is to be situated close thereto for non-chatter or power-failure purposes, while at the same time maintaining high, magnetic efficiency.

The stainless steel for disc 35 should be non-magnetic; however, any non-magnetic material of suitable hardness may be used.

Having thus described my invention in structural and functional detail, the parts and combinations which I particularly claim as my invention are:

1. In an electric motor including a field core and a rotor system, a brake disc rotatable coaxially with said rotor system and having peripheral notches, friction means pressing said disc into braking engagement with said rotor system for rotation therewith, a brake lever, means yieldingly urging said lever into a normal braking position to be engaged by one of said notches and restrain said disc against rotation whereby to arrest said rotor system, and magnetically attractable means connected with said lever and positioned relative to said core to be attracted thereby when the motor is energized to move said lever out of braking position relative to said notches such that said disc can rotate with said rotor system.

2. Brake means as defined in claim 1 and further characterized by the provision of a gapping bore in said core in the region of said magnetically attractable means for increasing the field strength thereat.

3. In an electric motor, the combination with a field core and armature rotatable in the field thereof, of brake means comprising a lever pivoted on an axis parallel with the axis of rotation of the armature, a brake disc on the armature axis for rotation therewith and having a plurality of peripheral notches, a spring-urged presser disc on said armature axis and bearing against said brake disc to press the same frictionally against said armature for rotation therewith as aforesaid, a brake pawl on said lever and disposed in position to engage in said notches when said lever is pivoted into braking position, spring means normally pivoting said lever into said braking position, a magnetically attractable offset portion on said lever positioned in the region of concentrated external flux of said core to be attracted by the magnetic field thereof when said motor is energized for running, whereby to pivot said lever out of said braking position and withdraw said brake pawl from engagement with any said notch.

4. The combination defined in claim 3 and further characterized by the provision of a gapping bore in said core in the region of said magnetically attractable offset to effect a concentration of field flux thereat.

5. In an electric motor having a rotor and a field frame, a magnetic brake comprising a V-shaped lever pivoted to rock about an axis parallel to that of the rotor, one leg of the lever including a magnetically attractable offset overlying a field flux source on said frame for attraction thereby in brake-releasing action, means yieldingly urging said lever to a normal braking position, a brake member coaxial with said rotor and cooperating with the remaining leg of said lever to brake said rotor in said normal braking position of said lever.

6. Brake means as defined in claim 5 and further characterized in that said coaxial brake member is a toothed disc frictionally rotatable with said rotor, and said remaining leg of the lever has a member engageable, in the normal braking position of the lever, with a toothed portion of said disc in braking action to hold the disc against motion and frictionally brake said rotor.

7. In an electric motor having a laminated field frame and a rotor bore therethrough normal to the planes of the laminae, rotor means revolvable in said bore, brake means cooperable with said rotor means, a flat magnetic brake lever pivoted to turn in a plane parallel to an outermost one of said laminae into and out of brake-actuating relation with said brake means, said lever having an integral extension projecting to an edge of said frame adjoining a side thereof overlying said bore, and an integral offset projecting to overlie said side and extend substantially in parallelism with the axis of said bore above a substantial length of the latter, and spring means normally pivoting said lever to actuate said brake and raise said offset away from said frame side, magnetization of the frame attracting the offset to pivot the lever to release the brake by stray flux from the region of said rotor and bore.

ELMER L. HOFFMANN.

REFERENCES CITED

The following references are of record in the file of this patent:

UNITED STATES PATENTS

| Number | Name | Date |
|---|---|---|
| 521,138 | Crowdus | June 5, 1894 |
| 938,501 | McBerty | Nov. 2, 1909 |
| 1,437,421 | Holliday | Dec. 5, 1922 |
| 2,144,416 | Nevinger | Jan. 17, 1939 |
| 2,340,052 | Grimes | Jan. 25, 1944 |

FOREIGN PATENTS

| Number | Country | Date |
|---|---|---|
| 123,971 | Switzerland | Jan. 2, 1928 |